United States Patent
Krepela et al.

(12) Patent No.: US 6,273,053 B1
(45) Date of Patent: Aug. 14, 2001

(54) ENGINE SHUTDOWN VALVES

(75) Inventors: Joseph J. Krepela; Kieran F. Bozman, both of Edmonton (CA)

(73) Assignee: JKKB Holdings Corp., Alberta (CA)

( * ) Notice: Subject to any disclaimer, the term of this patent is extended or adjusted under 35 U.S.C. 154(b) by 0 days.

(21) Appl. No.: 09/517,860

(22) Filed: Mar. 3, 2000

(51) Int. Cl.⁷ .............................. F02B 77/00; F16K 3/00
(52) U.S. Cl. ........................... 123/198 D; 123/198 F; 251/327; 251/294
(58) Field of Search .................. 123/198 D, 198 F; 251/301, 302, 303, 326, 327, 63, 193, 294, 297

(56) References Cited

U.S. PATENT DOCUMENTS

| | | | |
|---|---|---|---|
| 789,132 | * 5/1905 | Bachman | 251/294 |
| 2,884,222 | * 4/1959 | Oakes | 251/73 |
| 4,174,725 | 11/1979 | LaPere | 137/68 |
| 4,215,845 | * 8/1980 | Sturgeon | 251/63 |
| 4,285,494 | * 8/1981 | Sturgeon | 251/63 |
| 4,310,012 | 1/1982 | Billington et al. | 137/75 |
| 4,380,977 | 4/1983 | Holstein | 123/198 |
| 4,401,068 | 8/1983 | Bristol | 123/198 |
| 4,422,418 | * 12/1983 | Dorn | 123/198 D |
| 4,428,337 | * 1/1984 | Parsons | 123/198 F |
| 4,452,394 | 6/1984 | Emrich | 239/177 |
| 4,501,238 | * 2/1985 | Odum | 123/198 D |
| 4,537,386 | * 8/1985 | Krepela et al. | 251/302 |
| 4,546,954 | * 10/1985 | Bodnar | 251/88 |
| 5,103,852 | 4/1992 | Jones et al. | 137/71 |
| 5,203,536 | 4/1993 | Krepela | 251/74 |
| 5,205,252 | * 4/1993 | Krepela | 123/198 D |
| 5,653,207 | * 8/1997 | Denton | 123/198 D |
| 5,730,170 | 3/1998 | Sanchez | 137/77 |
| 5,755,402 | 5/1998 | Henry | 244/29 |
| 5,762,316 | 6/1998 | Barnett | 251/63.5 |
| 6,032,921 | * 3/2000 | Krepela | 251/63.4 |

FOREIGN PATENT DOCUMENTS 2044379   12/1992  (CA) ............... F01L/003/00

* cited by examiner

*Primary Examiner*—Noah P. Kamen
*Assistant Examiner*—Hai Huynh
(74) *Attorney, Agent, or Firm*—Flynn, Thiel, Boutell & Tanis, P.C.

(57) ABSTRACT

The shutdown valve design is comprised of a housing in which a gate slides from an open to a closed position in a guillotine type motion. At one end of the housing is an unobstructed bore, which is the air through flow passage, and which has a longitudinal axis perpendicular to the guillotine movement of the gate and the main body of the housing. In the closed position, the gate completely obstructs the air flow through passage.

Two compression springs are installed inside the housing so that they push against two extensions on the circumference of the gate, and which force the gate into the closed position if it is not held in the open position by a latching mechanism. The gate is pulled into the open position, against the spring force, by a flexible member (example: steel cable, wire, chain) that is attached to the gate at one end, and to a spool within the housing or alternatively a remote actuator outside the housing, at the other end. Rotation of the spool within the housing wraps the flexible member and pulls the gate into the open position. Similarly, pulling on the flexible member by a remote mounted actuator would also move the gate into the open position. The gate is typically held in the open position by a latching spindle that operates perpendicular to the rotation of the spool within the housing, and which can move via a compression spring into a located mating hole in the circumference of the spool, creating a restriction to the spools rotation. With the spool so restricted, the gate would remain in the open position until the latching spindle is pulled out through manual, electric, or hydraulic/pneumatic means. Similarly, a latching spindle would restrict the movement of a remote mounted actuator, and therefore the valve gate, until released by manual, electric, or hydraulic/pneumatic means.

15 Claims, 3 Drawing Sheets

ENGINE SHUTDOWN VALVES

FIELD OF THE INVENTION

This invention relates to engine shutdown valves.

BACKGROUND OF THE INVENTION

Engine shutdown valves are well known accessories on both stationary and mobile engine applications around the world, and have been in use for over forty years. The basic reason for installing a shutdown valve is to have a safety device that allows control over the operation of an engine. The most common justification for this need is to terminate the operation of a diesel engine when an uncontrolled over-speed results from the inhalation of combustible vapors through the engine air cleaner. Without such a shutdown device the engine may continue over-speeding until catastrophic failure occurs. By shutting off the air intake manifold, the shutdown valve starves the engine of oxygen (and the secondary fuel source) and terminates combustion in the cylinders, therefore preventing damage caused by uncontrolled over-speed. Other applications result from the basic need to have a positive means of shutting down an engine.

Engine shutdown valves with reciprocating gates are known from U.S. Pat. No. 4,285,494 issued Aug. 25, 1981, U.S. Pat. No. 4,501,238, issued Feb. 26, 1985, and U.S. Pat. No. 5,205,252, issued Apr. 27, 1993. This invention is an improvement in the art of shutdown valves with reciprocating gates, and provides a compact and reliable device that is easy to make and operate.

SUMMARY OF THE INVENTION

This invention relates to an engine shutdown valve (also known as an air intake shut-off valve), of unique design and construction, which is used to terminate the operation of an engine when actuated. A unique aspect of the design is the use of a flexible member to connect the valve gate to the opening and latching mechanisms within the valve housing, or to remote mounted opening and latching mechanisms outside the housing.

According to a first aspect of the invention there is therefore provided an engine shutdown valve, comprising:

a housing defining an air flow through passage;

a gate slidable in the housing from a position in which the air flow through passage is open to a position in which the air flow through passage is closed;

a spring mechanism mounted on the housing in a position that urges the gate to the closed position;

a latch having a latch position and a release position;

an actuator for the latch, the actuator being operable, for example in response to an engine operating condition, to move the latch from the latch position to the release position;

a flexible member connected between the latch and the gate to restrain the gate from being urged to the closed position by the spring member when the latch is in the latch position and to release the gate when the latch is in the release position.

The gate closes in a guillotine type motion. The air through flow passage preferably has a longitudinal axis perpendicular to the guillotine movement of the gate and the main body of the housing. In the closed position, the gate completely obstructs the air flow through passage.

The spring mechanism may comprise two compression springs installed inside the housing so that they push against two extensions on the circumference of the gate, and which force the gate into the closed position if it is not held in the open position by a latching mechanism. The gate is pulled into the open position, against the spring force, by a flexible member (example: steel cable, wire, chain) that is attached to the gate at one end, and to a spool within the housing or alternatively a remote actuator outside the housing, at the other end. Rotation of the spool within the housing wraps the flexible member and pulls the gate into the open position. Similarly, pulling on the flexible member by a remote mounted actuator would also move the gate into the open position. The gate may be held in the open position by a latching spindle that operates perpendicular to the rotation of the spool within the housing, and which can move via a compression spring into a located mating hole in the circumference of the spool, creating a restriction to the spools rotation. With the spool so restricted, the gate would remain in the open position until the latching spindle is pulled out through manual, electric, or hydraulic/pneumatic means. Similarly, a latching spindle would restrict the movement of a remote mounted actuator, and therefore the valve gate, until released by manual, electric, or hydraulic/pneumatic means.

These and other aspects of the invention are described in the detailed description of the invention and claimed in the claims that follow.

BRIEF DESCRIPTION OF THE DRAWINGS

There will now be described preferred embodiments of the invention, with reference to the drawings, by way of illustration only and not with the intention of limiting the scope of the invention, in which like numerals denote like elements and in which.

DETAILED DESCRIPTION OF PREFERRED EMBODIMENTS

In this patent document, "comprising" means "including". In addition, a reference to an element by the indefinite article "a" does not exclude the possibility that more than one of the element is present.

Figure 1:
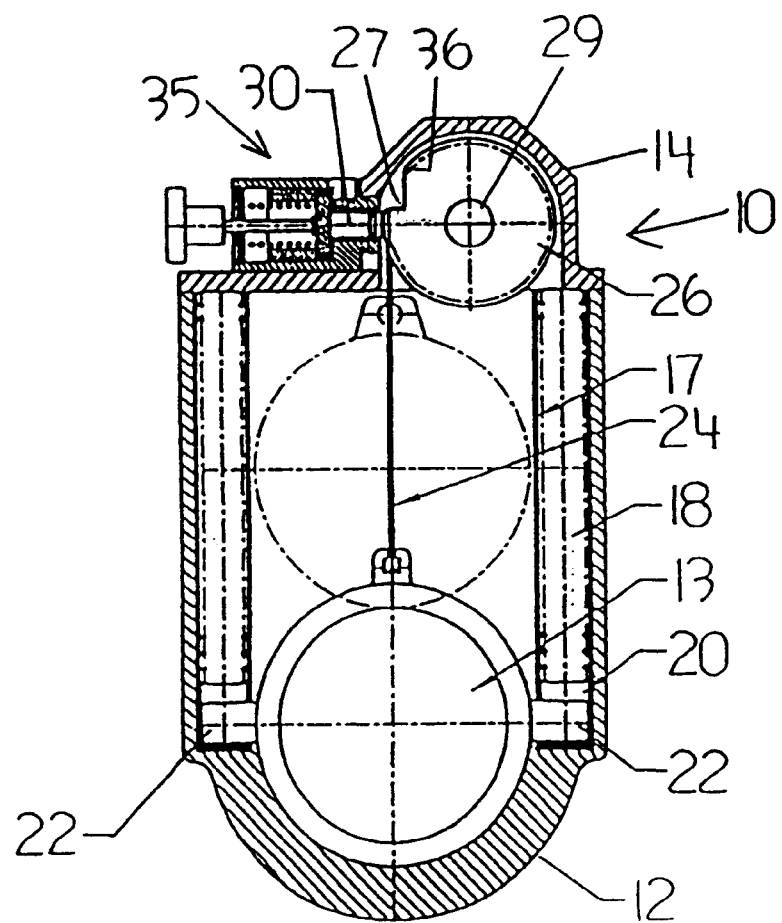
FIG. 1 is a cross sectional view of the engine shutdown valve with an 'in housing' latching spindle.
Figure 2:
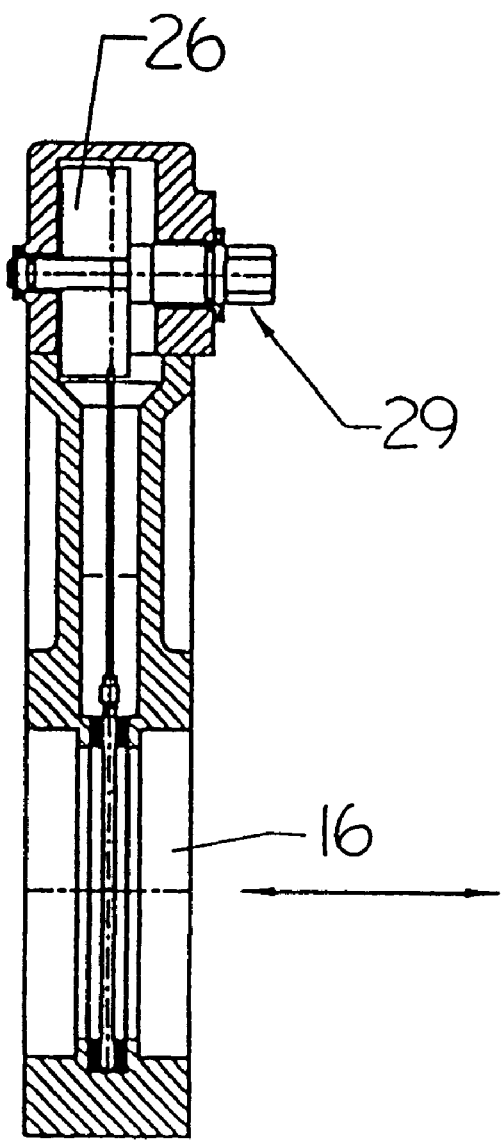
FIG. 2 is a cross sectional view of the engine shutdown valve, with an 'in housing' latching spindle, that is perpendicular to FIG. 1.
Figure 3:
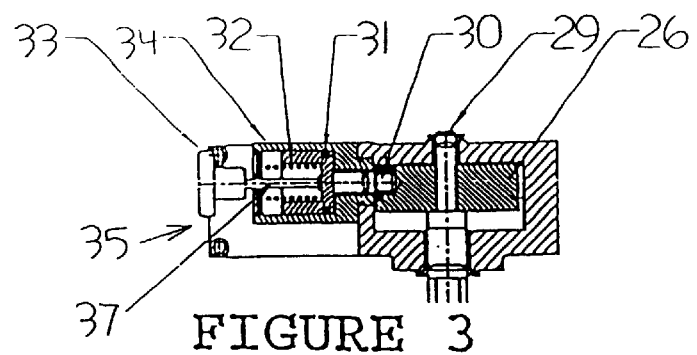
FIG. 3 is a cross sectional view of the engine shutdown valve, with an 'in housing' latching spindle, that is perpendicular to FIG. 1 but viewed from the top down (details the latching mechanism).
Figure 4:
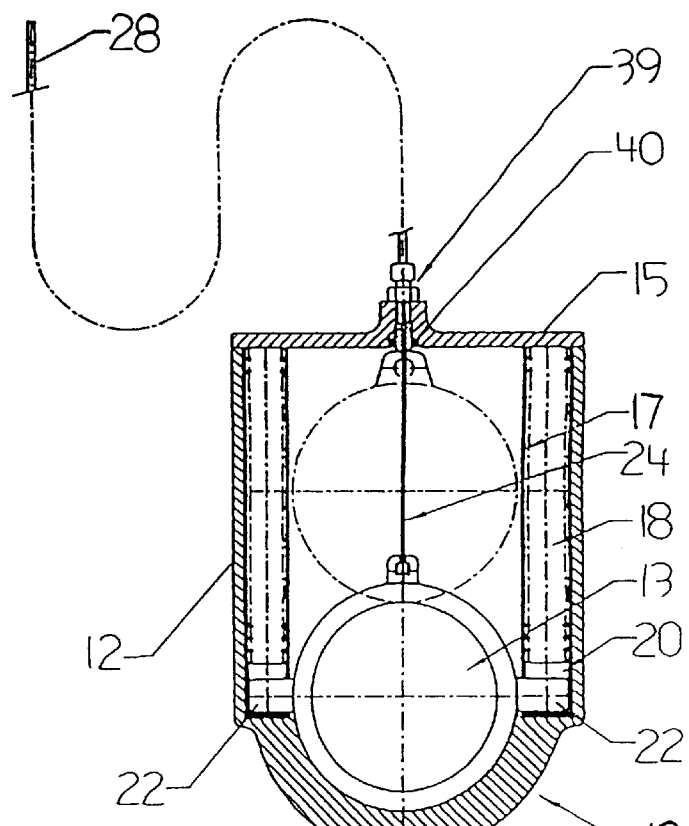
FIG. 4 is a cross sectional view of the shutdown valve for use with a remote mounted latching mechanism or actuator,.

Preferred embodiments of the engine shutdown valve according to this invention are shown in FIGS. 1, 2, 3 & 4. A shutdown valve housing 10 is formed of a bottom housing 12 and a top housing 14. There is an air flow through passage/bore 16 in the bottom housing 12, that is centered at the same point as the radius of the bottom housing 12. The top housing 14 shown in FIGS. 1 and 2 is used for incorporation of latching mechanisms into the housing. Top housing 15 shown in FIG. 4 is formed as a cover, and used for remote latching mechanisms. A gate 13 is installed within the housing 10, and is movable between a position in which it closes the air flow passage 16 (solid lines) and a position in which the air flow passage 16 is open (dashed lines).

In the housing of the shutdown valve are two sleeves 17 (FIGS. 1 and 4), that are held in position and closed at both ends by the bottom housing 12 and the top housing 14 or cover 15. The two sleeves 17 have slots down the sides facing the gate 13, and each sleeve 17 encloses a compression spring 18 held between the top housing 14 or cover 15 at one end and a movable gate guide 20, also enclosed within each sleeve 17, at the other end.

The shutdown valve 10 includes a gate 13 that has two extensions 22 on the circumference, at 180 degrees apart, that extend through the slots in the sleeves 17, and which fit into a mating slot in the gate guide 20 located within each sleeve 17. Located in such a way, the compression springs 18 push against the top housing 14 or cover 15 at one end, and the gate guides 20 at the other end. The gate guides 20 in turn push against the gate extensions 22 and force the gate 13 to the closed position unless otherwise latched. In the closed position, the gate 13 completely obstructs the air flow through passage/bore 16.

The shutdown valve 10 includes a flexible member 24 and which is connected to the gate 13 at one end, and to a spool 26 mounted in the top housing 14, at the other end. The flexible 24 member partly encircles the spool 26. Alternatively, the flexible member 24 is connected to the gate 13 and a remote mounted actuator 28 at the other end (FIG. 4). Pulling on the flexible member 24 forces the compression of the two springs 18 by way of the gate extensions 22 and the gate guides 20, therefore moving the gate 13 from the closed to the open position.

The spool 26 is mounted for restricted rotation on an operating shaft 29. Rotation of the operating shaft 29, which extends through openings in the top housing 14, also rotates the spool 26. The spool 26 has a hole 27 bounded by a shoulder 36 in its circumference that extends radially into the spool 26 and operating shaft rotation, and into which a latching spindle 30 can extend. Extending the latching spindle 30 into the hole 27 restricts rotation of the spool 26 and operating shaft 29 due to contact of the shoulder 36 with the latching spindle 30 and therefore holds the gate 13 in the open position.

The latching mechanism or latch for the shutdown valve includes the spool 26 and spindle 30, and is equipped with an actuation mechanism or actuator 35, which may be of various actuation designs including manual pull, electric via solenoid, pneumatic, or hydraulic. FIG. 3 depicts an exemplary manual or pneumatic combination of actuation mechanism and includes the latching spindle 30, that is pushed toward the spool 26 by a spindle spring 32. A pull force applied to the latching spindle 30 by an actuating mechanism retracts it from the hole 27 in the spool 26, therefore allowing the spool 26 and operating shaft 29 to rotate and the gate 13 to move to the closed position. The spring 32 urges the latching spindle 30 into engagement with the spool 26, and when the spindle is engaged with the spool 26, the latch is in the latch position. Removal of the spindle 30 from the hole 27, disengages the latch and places it in the release position. The flexible member 24 restrains the gate 13 from being urged to the closed position by the springs 18 when the latch is in the latch position and releases the gate 13 when the latch is in the release position (spindle 30 out). The actuator 35 is responsive to an engine operating condition (such as an over speed condition) to pull the spindle 30 from the hole 27.

The actuator 35 shown in FIG. 3 is a manual or pneumatic actuator. The spring 32 in the actuator 35 may be received by a receptacle 34 that is sealed by an o-ring 31 to the actuator body 35. A control knob 33 is connected by a rod 37 to the receptacle 34. Pulling on the knob 33 pulls against the spring 32 to remove the spindle 30 from the hole 27 and disengage the spindle 30 from the spool 26.

Similarly, a remote latching mechanism 28 can be of various actuation designs including manual, electric, pneumatic, and hydraulic. In the 'latched' position, the gate 13 is restricted from movement and held in the open position. When the remote latching mechanism 28 is released via any of the actuation methods, the gate 13 is pushed into the closed position by the two compression springs 17 exerting force on the two gate guides 20 and in turn on the gate extensions 22. In the embodiment of FIG. 4, the flexible member 24 passes through the cover 15 through a threaded nipple 39 sealed to the top housing 15 at 40.

The actuator may be operated automatically in response to an engine operating condition. Thus, for example, the actuator 28, 35 may receive a signal indicating that the engine is in an overspeed condition and in response to this may shut down the engine by actuating the latch release. Techniques for sensing engine operating condition and providing a signal to the actuator are well known in the art and need not be further described.

Immaterial modifications may be made to the invention described here without departing from the essence of the invention.

The embodiments of the invention in which an exclusive property or privilege is claimed are defined as follows:

1. An engine shutdown valve, comprising:
   a housing defining an air flow through passage;
   a gate slidable in the housing from a position in which the air flow through passage is open to a position in which the air flow through passage is closed;
   a spring mechanism mounted on the housing in a position that urges the gate to the closed position;
   a latch having a latch position and a release position;
   an actuator for the latch, the actuator being operable to move the latch from the latch position to the release position;
   a flexible member connected between the latch and the gate to restrain the gate from being urged to the closed position by the spring member when the latch is in the latch position and to release the gate when the latch is in the release position.

2. The engine shutdown valve of claim 1 in which the flexible member is selected from the group consisting of a wire, cable and chain.

3. The engine shutdown valve of claim 1 in which the latch is mounted in the housing.

4. The engine shutdown valve of claim 1 in which the latch is remotely mounted away from the housing.

5. The engine shutdown valve of claim 1 in which the latch comprises:
   a spool that the flexible member at least partly encircles; the spool having a shoulder; and
   a spindle, the spindle being engaged with the shoulder in the latch position and being disengaged from the shoulder in the release position, the spindle being actuated by the actuator.

6. The engine shutdown valve of claim 1 in which the housing comprises a first sleeve and a second sleeve, and respective first and second extensions on the gate are received by the first and second sleeves.

7. The engine shutdown valve of claim 6 in which the spring mechanism comprises first and second springs, a first spring being mounted in the first sleeve and engaged with the first extension to urge the gate closed and a second spring being mounted in the second sleeve and engaged with the second extension.

8. The engine shutdown valve of claim 1 in which the gate is mounted for motion perpendicular to the flow through the air flow through passage.

9. The engine shutdown valve of claim 8 in which the flexible member is selected from the group consisting of a wire, cable and chain.

10. The engine shutdown valve of claim 9 in which the latch comprises:

a spool that the flexible member at least partly encircles;

the spool having a shoulder; and a spindle, the spindle being engaged with the shoulder in the latch position and being disengaged from the shoulder in the release position, the spindle being actuated by the actuator.

11. The engine shutdown valve of claim 10 in which the housing comprises a first sleeve and a second sleeve, and respective first and second extensions on the gate are received by the first and second sleeves.

12. The engine shutdown valve of claim 11 in which the spring mechanism comprises first and second springs, a first spring being mounted in the first sleeve and engaged with the first extension to urge the gate closed and a second spring being mounted in the second sleeve and engaged with the second extension.

13. The engine shutdown valve of claim 12 in which the latch is mounted in the housing.

14. The engine shutdown valve of claim 12 in which the latch is remotely mounted away from the housing.

15. The engine shut down valve of claim 1 in which the actuator is responsive to an engine operating condition.

* * * * *